United States Patent [19]

Case, deceased et al.

[11] Patent Number: 5,013,361
[45] Date of Patent: May 7, 1991

[54] BALL-POINT WRITING INSTRUMENT CONTAINING AN AQUEOUS INK COMPOSITION

[75] Inventors: Laura K. Case, deceased, late of Winchester, by Leslie C. Case, executor; Chandrasen Gajria, Hingham; Rachel M. Loftin, Halifax; Henry Peper, Marblehead, all of Mass.

[73] Assignee: The Gillette Company, Boston, Mass.

[21] Appl. No.: 123,827

[22] Filed: Nov. 23, 1987

Related U.S. Application Data

[63] Continuation-in-part of Ser. No. 809,174, Dec. 19, 1985, abandoned, which is a continuation-in-part of Ser. No. 693,930, Jan. 23, 1985, Pat. No. 4,671,691.

[51] Int. Cl.$^5$ ............................................. C09D 11/00
[52] U.S. Cl. ........................................ 106/22; 106/20; 106/23; 106/25
[58] Field of Search ...................... 106/25, 26, 30, 22, 106/20, 23; 401/141, 213

[56] References Cited

U.S. PATENT DOCUMENTS

| | | | |
|---|---|---|---|
| 3,526,522 | 9/1970 | Seregely et al. | 106/170 |
| 3,656,857 | 4/1972 | Seregely et al. | 401/142 |
| 4,471,079 | 9/1984 | Enami | 523/161 |
| 4,545,818 | 10/1985 | Inoue et al. | 106/22 |
| 4,726,845 | 2/1988 | Thompson et al. | 106/25 |

FOREIGN PATENT DOCUMENTS

| | | |
|---|---|---|
| 57-23463 | 8/1983 | Japan . |
| 2094820 | 3/1982 | United Kingdom . |
| 2131040 | 6/1984 | United Kingdom . |

*Primary Examiner*—Prince E. Willis
*Assistant Examiner*—John F. McNally
*Attorney, Agent, or Firm*—John P. Morley

[57] ABSTRACT

Aqueous based shear-thinning ink compositions and ball-point pens including the ink compositions. The ink compositions have a shear thinning index of from about 0.01 to about 0.6 and include colorant material(s) and a water dispersible, polymeric shear-thinning material substantially uniformly dispersed in a highly polar solvent system in which water is the primary solvent for the shear-thinning material.

37 Claims, No Drawings

BALL-POINT WRITING INSTRUMENT CONTAINING AN AQUEOUS INK COMPOSITION

CROSS REFERENCE TO RELATED APPLICATIONS

This application is a continuation-in-part of Application Ser. No. 809,174 filed Dec. 19, 1985 by Laura K. Case, Chandrasen Gajria, Rachel M. Loftin and Henry Peper, now abandoned, which, in turn, was a continuation-in-part of Application Ser. No. 693,930 filed Jan. 23, 1985 by the above-named inventors and which has issued as U.S. Pat. No. 4,671,691.

BACKGROUND OF THE INVENTION

Part 1. The Field of the Invention

The present invention relates to aqueous based shear-thinning ink compositions and to ball-point pens employing such ink compositions which preferably include a viscoelastic ink follower.

Part 2. Description of the Prior Art

While there are long-recognized cost advantages in employing aqueous ink compositions in ball-pen writing instruments, their typically low viscosity leads to a number of performance disadvantages. These include the possibility of leakage around the rotating ball due to changes in atmospheric pressure or temperature or due to temperature increases resulting from the heat conducted from the fingers of the user. Attempts have been made to overcome these disadvantages by employing a fibrous ink reservoir intended to supply a flow of ink to the rotating ball at a rate just sufficient to result in the formation of a continuous line during use but insufficient to provide an excess supply of liquid ink at the writing tip leading to leakage. Other attempts to accomplish the same result have involved the use of liquid ink reservoirs employing porous ink feed rods in the form of sintered fibrous bundles or extruded plastic ink rods having capillary channels and intended to control the rate of ink feed to the rotating ball. Examples of prior art patents employing such systems to control the flow of aqueous inks in ball-pen writing instruments include British Patent Specification No. 1,139,038 and U.S. Pat. Nos. 3,446,564; 3,533,708; 3,572,954; 3,873,218; and 4,145,148.

The disadvantages of using an ink-feeding system of the types discussed above include failure to provide a sufficiently continuous flow of ink to the ball for rapid use and a reduced writing life since the amount of ink retained by a fibrous reservoir may amount to as much as one-half of the total amount of ink in the writing instrument. A further disadvantage lies in the fact that inks containing pigments as opposed to soluble dyes will tend to clog the capillary passages in fibrous reservoirs and feed rods further inhibiting the rate of flow and the amount of ink which is delivered to the point before the writing instrument becomes inoperative.

If it is attempted to solve the above problems by leaving out the fibrous reservoir and/or capillary feed rod and simply thickening the aqueous ink composition, another problem is encountered. Should the continuity of the ink column above the rotating ball be broken by solvent evaporation from the point or from shock during shipping or dropping, it is likely that the pen will become non-functional.

BRIEF SUMMARY OF THE INVENTION

The novel, improved ink compositions of the present invention are aqueous based, shear-thinning inks for writing instruments. The ink compositions have a high viscosity at low shear rates and comprise a substantially uniform dispersion of colorant(s) and a water dispersible polymeric shear-thinning material (or shear-thinning providing material) dispersed in a polar solvent system in which water is the primary or essential solvent for the shear-thinning material. While the ink compositions have a high viscosity at low shear rates, they undergo shear-thinning and are readily flowable in response to shear rates produced in writing to provide a writing ink having an especially desirable combination of performance characteristics.

In the preferred writing instruments of the present invention, the ink compositions are contained in hollow, non-pressurized or relatively low pressurized tubes or reservoirs and the ink is fed to the point of a ball-point pen. Preferred writing instruments also include a cap member to seal the ball point and the tip when the cap is in place to control evaporation of volatile components of the ink and leakage of air around the ball into the ink reservoir which may cause formation of a gas bubble upstream of the ball. Such a gas bubble can cause breakage of contact between the column of ink and the ball and the performance of the instrument will be affected until contact is restored. In the especially preferred writing instruments, the ink is used in combination with a viscoelastic follower composition having specific rheological properties which insure a smooth flow of ink to the ball as the ink supply is consumed.

DETAILED DESCRIPTION OF THE PREFERRED EMBODIMENTS

The ink compositions employed in the practice of this invention are thickened, viscous liquids at rest. They are non-Newtonian liquids and may have a rheological yield value and exhibit shear-thinning flow behavior or shear-thinning flow characteristics. In other words, they become thin readily flowable liquids, having a viscosity of no greater than 100 cPs (or mPa.s), at shear rates produced in writing such as with a ball-point pen. The inks contain at least one water-dispersible, polymeric, shearing-thinning material dispersed in a polar solvent system in which water is the primary solvent for the polymeric shear-thinning material. The inks also include colorant material including dyes and/or pigments. Especially preferred polymeric shear-thinning providing materials are those which are substantially soluble in water. Other conventional ingredients such as surfactants, preservatives, corrosion inhibitors, and humectants may also be included in the ink.

The polymeric shear-thinning materials of aqueous ink compositions of the present invention are the essential ingredients which provide the primary control over the rheological and/or thixotropic characteristics of the ink compositions. Other thickening materials may be used in combination with the shear-thinning material(s) if desired to provide ink compositions having selected performance characteristics. However, such other materials are not needed or required to achieve the essential rheological and/or thixotropic control function provided by the shear-thinning material(s).

Polymeric shear-thinning materials suitable in the practice of the invention are those which can be dispersed in a highly polar solvent system to provide an ink having a shear-thinning index (n) of between about 0.01 to about 0.6 and most preferably between about 0.05 to about 0.3 or 0.4. For the purposes of this invention, the shear-thinning index (n) is calculated by fitting shear stress (T) and shear rate values (ẏ) obtained from rheological measurements on a viscometer such as a HAAKE ROTOVISCO, Haake Inc., Saddle Brook, N.J. to the empirical power law equation $T=K\dot{y}^n$ (where K and n are calculated constants). Additionally, the shear-thinning index is obtained by measurements of an aqueous solution of the shear-thinning material at shear rates between about 30 to about 300 sec$^{-1}$. Shear stress values are measured from the curve on the HAAKE ROTOVISCO at different shear rates (typically 30, 90, 150, 210 and 300 sec$^{-1}$) and the measured shear stress values are fitted to the shear rates using a curve-fitting program.

Suitable polymeric shear-thinning materials provide inks which are thickened viscous liquids at rest or at low shear rates. For example, inks of the present invention have a viscosity of at least 50 cPs and usually about 100 cPs or higher at a shear rate of 30 sec$^{-1}$. However, in response to shear rates produced by writing, the inks undergo shear-thinning and have a viscosity of less than about 100 cPs at shear rates produced by writing. Accordingly, polymeric shear-thinning materials suitable in the practice of the invention are those providing a shear-thinning index (n) between about 0.01 to about 0.6, a viscosity of 50 cPs or greater at a shear rate of 30 sec$^{-}$ and a viscosity of less than about 100 cPs at shear rates produced by writing.

Preferred polymeric shear-thinning materials provide aqueous ink compositions which do not undergo a significant change in viscosity in response to temperature. For the purposes of this invention, "a significant change in viscosity in response to temperature" is a change of greater than about 50 percent in the viscosity measurement of the ink composition (at the same shear rate) over at least one segment of a successive temperature range of about 10° C. which is within the temperature range of from about 0° C. to about 60° C. Especially preferred shear-thinning materials are those which do not undergo any significant change in viscosity over a 10° C. temperature range segment within the temperature range between about 5° C. to about 35° C. In other words, suitable polymeric shear-thinning materials are those which provide aqueous ink compositions having the described shear thinning index and also provide ink compositions in which the change in viscosity measurement is not greater than about 50 percent between for example, 0° C.–10° C. or 10° C.–20° C. or 20° C.–30° C. or 25° C.–35° C., etc.

Especially preferred specific shear-thinning materials are xanthan gum, carageenan gum, locust bean gum, hydroxyethylcellulose and guar gum. Xanthan gum is particularly preferred since aqueous based, xanthan gum containing ink compositions have been found to have "n" values of about 0.10 to about 0.20. Additionally, aqueous based, xanthan gum containing inks do not undergo any significant changes in viscosity measurements over a temperature range from about 0° C. to about 40° C. or higher. Actually, the viscosity measurements for aqueous based, xanthan gum containing inks are substantially constant throughout the above temperature range. Equilibrium shear stress values for aqueous based carrageenan gum containing inks (obtained by repeated measurements on the Haake Rotovisco) fitted to the power law yield a shear-thinning index of 0.3 to about 0.4. Aqueous based carrageenan gum containing inks also provide viscosity measurements which are substantially constant over the temperature range from the 5° C. to about 35° C. Aqueous based inks containing hydroxyethylcellulose have a shear-thinning index calculated to be about 0.4 to about 0.6 and do not undergo any significant changes in viscosity measurements over a temperature range from about 15° C. to about 30° C. Preferred commercially available xanthan gums are sold by the Kelco Company under the trade names KELTROL and KELZAN.

The amount of any of the above-mentioned water-dispersible gums or resins useful in the practice of the invention will vary depending upon which gum or other ingredients are used. Especially preferred amounts of the water-dispersible gum or resin are amounts from at least about 0.45 to about 5 percent by weight. For example, the best balance of performance characteristics particularly in terms of ink lay down rates and ink lay down characteristics is achieved by using amounts of polymeric shear-thinning material(s) between about 0.5 to about 5 percent by weight and preferably between about 0.5 to about 2.5 percent by weight. Ink compositions including amounts of shear-thinning material less than about 0.5 percent by weight provide acceptable performance characteristics when used in pens which include fine points, i.e., points having a diameter no greater than about 0.5 mm. However, such ink compositions tend to wick, blot or leak excessively when used in pens having larger diameter points even though the ink reservoir of the pen is unpressurized. In contrast, ink compositions having increased amounts of shear-thinning materials, such as between about 0.7 to about 1.5 percent by weight or higher, provide an extremely desirable combination of performance characteristics when used in pens having fine points as well as in pens having point diameters up to about 1. mm or somewhat higher.

Ink compositions of this invention are aqueous based shear-thinning inks and include a polar solvent system in which water is the essential solvent and functions as the primary solvent for the polymeric shear-thinning material(s). The polar solvent system may comprise from about 50 to about 99 percent by weight of the ink composition. While water is the primary or essential solvent of the solvent system, other polar solvents can be included in the solvent system in place of up to about 50 percent (or somewhat higher) by weight of the water in the solvent system. Preferred ink compositions of this invention are those having about 70 percent (or greater) by weight of water in the polar solvent system. As will be demonstrated in the Examples which follow, ink compositions of this invention can comprise polar solvent systems having 100 percent by weight water or substantially 100 percent by weight water. In short, water is the primary solvent of the polar solvent systems of inks of the present invention and, the use of any other particular polar solvent and the amount thereof used in combination with water is not an especially critical feature in the ink compositions of this invention.

Other polar solvents which may be included in the polar solvent systems of ink compositions of the present invention are those which function as hygroscopic wetting agents useful in reducing the ink drying rates and include dihydric alcohols such as ethylene glycol, diethylene glycol, triethylene glycol, 1,3-propanediol, propylene glycol, 1,3-butylene glycol, 1,4-butanediol, 2,3-butylene glycol, neopentyl glycol hexylene glycol, thiodiglycol, and the like. It is also possible to employ tri- and higher-hydric alcohols such as glycerin, trimethylolethane, trimethylolpropane, 3-methyl pentane-2,3,5-triol, diglycerin, sorbitol, and the like. Other polar-solvent wetting agents may include pyrrolidone, N-methyl-2-pyrrolidone, dimethylformamide, urea, and the like. Preferred amounts of other polar solvents which may be included in the polar solvent system are between about 5 to about 20 percent by weight of the total weight of the polar solvent system.

It has also been found useful to include in the ink compositions of this invention an organic solvent material capable of penetrating into the paper-writing surface to act as a drying agent and also to act as a levelling agent for the ink to produce a smooth writing result. Examples of such materials include glycol ethers such as alkylene glycol mono- or di-alkyl ethers, glycol ether acetates such as alkylene glycol mono- or di-alkyl ethers and glycol acetates such as alkylene glycol mono- or di-acetates. The especially preferred drying and levelling function complex includes fluorinated polysilane surface active agents such as the product sold under the trademark LEVELENE 100 (American Color & Chemical Corp.). These materials, when employed, can be used in amounts of from about 0.01 to about 2.0 percent by weight, preferably from about 0.1 to about 1.0 percent.

The colorant material to be employed in the inks of this invention may be any of the water-soluble or dispersible dyes or pigments or mixtures thereof known to be useful in the formulation of inks for writing instruments. Preferred ink compositions comprise from about 0.1 to about 30 or somewhat higher percent by weight colorant material based on the total weight of the ink composition. Examples of dyes or pigments which can be used include, but are not limited to, DIRECT VIOLET 99, DIRECT BLUE 86 (C.I. 74180), (both manufactured by the Mobay Chemical Co.); ELFTEX 5, MOGUL L and REGAL 330R, all carbon blacks (The Cabot Corporation), HIDRACOL X9220 and X9200 (Ciba-Geigy); and FAST LIGHT ORANGE 2GM (American Cyanamid).

Ink compositions of the present invention can include sequestering agents to maintain or improve stability. These sequesterants are normally added in the amount of 1-50% by weight of the water-soluble gum. Examples of useful sequestering agents include sodium hexametaphosphate, trisodium phosphate, and sodium glucoheptanate, and tetrasodium EDTA.

Ink compositions of the present invention can also include preservatives to prevent the growth of microorganisms, yeast, and mold. Examples of such preservatives include methyl p-hydroxybenzoate, propyl p-hydroxybenzoate, DOWICIL 75 and 200 (active ingredient: 1-(3-chloroallyl)- 3,5,7-triaza-1-azoniaadamantane chloride (Dow Chemical Co.). These biocides are typically present at amounts between about 0.01 to about 5 percent by weight of the ink.

When aqueous ink formulations are likely to come in contact with metals, it is possible that corrosion will occur. This can result in degradation of the metal surface over time. To prevent this occurrence, corrosion inhibitors such as benzotriazole are often used. Such materials may constitute up to about 5 percent by weight of the ink but are preferably used in amounts less than about 0.5 percent.

The inks of this invention are easily prepared by combining the desired ingredients in a blender or mixing with a propeller stirrer until homogeneity is achieved. Preferably the water-dispersible polymeric shear-thinning material is first added to distilled water and this combination mixed for about two hours. The other ingredients, if present, are added in the following order: other polar solvents, sequestering agents, preservatives, surfactants, corrosion inhibitors, and dyes and/or pigments. In some cases, the shear-thinning material can be pre-wet with a humectant if desired such as propylene glycol or glycerol. Generally, the amount of such humectant is 1 to 5 times by weight of the amount of shear-thinning material added.

Typical formulation of inks to be used in the practice of this invention follow.

EXAMPLE I

| Material | Weight Percent |
|---|---|
| EXAMPLE I | |
| Xanthan Gum | 1.00 |
| EDTA (tetrasodium) | 0.30 |
| Fluorinated polysilane surface active agent[1] | 0.50 |
| Benzotriazole | 0.20 |
| Methyl p-hydroxybenzoate | 0.30 |
| Propylene glycol | 15.00 |
| Dye (DIRECT VIOLET 99) | 6.00 |
| Water | 76.70 |
| EXAMPLE II | |
| Hydroxyethylcellulose | 1.25 |
| Dye-(FAST LIGHT ORANGE 2GM) | 3.30 |
| Dye (HIDACID FTM VIOLET 49) | 2.20 |
| Polyoxyethylene 20 sorbitan monolaurate (Tween 20) | 0.50 |
| Benzotriazole | 0.20 |
| Methyl p-hydroxybenzoate | 0.30 |
| Water | 92.25 |
| EXAMPLE III | |
| Xanthan Gum | 0.8 |
| EDTA (Tetrasodium) | 0.3 |
| NaOH (10% solution) | 0.1 |
| Methyl Paracept | 0.3 |
| Defoaming Agent[2] | 0.1 |
| Benzotriazole | 0.1 |
| DOWICIL 200 (preservative) | 0.2 |
| Dyes[3] (liquid dispersions) | 36.0 |
| Deionized Water | 62.1 |
| EXAMPLE IV | |
| Xanthan Gum | 1.0 |
| EDTA Tetrasodium | 0.3 |
| NaOH (10% solution) | 0.1 |
| Methyl Paracept | 0.3 |
| Defoaming Agent | 0.1 |
| Benzotriazole | 0.1 |
| DOWICIL 200 | 0.2 |
| LEVELENE 100 | 0.3 |
| Dyes (liquid dispersions) | 30.0 |
| Distilled Water | 67.0 |

[1] The fluorinated polysilane surface active agent used was a commercially available surface active agent sold by American Color and Chemical Company under the trade name LEVELENE 100.
[2] The defoaming agent used in this and the following Example was a commercially available defoaming agent sold by Witco Chemical Company under the trade name BALAB 3017A.
[3] The dyes used in this and the following Examples are commercially available, water dispersions of black and violet dyes sold by Mobay Chemical Company under the trade name PONTAMINE BLACK and PONTAMINE VIOLET. PONTAMINE BLACK contains about 40 percent by weight solids while PONTAMINE VIOLET contains about 35 percent by weight solids. The ratio of PONTAMINE BLACK to PONTAMINE VIOLET used was 5:1.

The ink compositions of Examples II, III and IV include polar solvent systems which contain at least about 98 percent by weight water and most likely contain about 100 percent by water. Accordingly, water is the primary solvent in the polar solvent systems of ink compositions of the present invention. Other polar solvents may be present in the composition but as evidenced by Examples II–IV, they are not needed to provide shear-thinning inks having the desired combination of performance characteristics.

| Material | Weight Percent |
| --- | --- |
| EXAMPLE V | |
| Xanthan Gum | 0.3 |
| Benzotriazole | 0.3 |
| Preservative | 0.3 |
| Lubricant | 0.5 |
| LEVELENE 100 | 0.5 |
| Dyes (liquid dispersions) | 24.0 |
| Distilled Water | 74.1 |

The ink of Example V was included in a reservoir of a ball-point pen which included a ball point having a diameter of about 0.8 mm. The ink provided extremely heavy lay-down characteristics and high lay-down rates indicating a low yield value or yield strength for the ink. Additionally, the ink was found to wick, that is to say, the ink stained cloth or paper when the point was maintained in contact with the cloth or paper. Wicking is a result of the capillary forces of the fibers of cloth or paper overcoming the yield value or yield strength of the ink to withdraw ink which collects about the point from the pen. Wicking of the ink of Example V can be controlled by using the ink in a pen having a fine ball point, i.e., a point having a diameter about 0.5 mm or lower. However, the problem is aggravated if the ball point diameter is increased above 0.5 mm.

In contrast to the ink of Example V, inks of the present invention containing more than about 0.5 percent by weight xanthan gum and particularly those containing more than about 0.75 percent by weight xanthan gum provide a desirable combination of lay-down rates and characteristics when used in pens having fine points or points of a diameter greater than 0.5 mm. For example, such inks do not evidence wicking when used in ball-point pens having diameters of 0.8 mm or greater.

Ball-point pens including the shear-thinning inks of the present invention preferably include a viscoelastic follower composition comprising mineral oil, polybutene and clay (BENTONE 34). The preferred viscoelastic follower compositions for use in combination with the shock-resistant shear-thinning inks of the present invention are described in detail in U.S. Pat. No. 4,671,691. Essentially the preferred viscoelastic follower compositions comprise from about 5 to about 99 percent by weight of the composition of mineral oil, from about 5 to about 99 percent by weight polybutene and from about 0.1 to about 10 percent by weight of an organophilic clay. The relative proportions of the above ingredients are selected so that the resultant follower composition exhibits increasing tan delta values over the shear rate range of 5 to 30,000 sec$^{-1}$ and also exhibit tan delta values of less than about 1 at shear rates up to 50 sec$^{-1}$.

Writing instruments of the present invention include structural elements common to conventional and commercially available ball-point writing instruments. Essentially, these elements include a body retaining an ink reservoir, means for delivery of the ink to a socket located at one end of the instrument and a rotatable point retained in the socket and adapted to apply ink delivered to the socket to a surface to provide visible markings on the surface. The especially preferred ball-point pens include a viscoelastic follower of the type described above in the reservoir.

From the above description it is apparent that the novel, improved shear-thinning inks of the present invention provide significant and unexpected advantages. They have high viscosities at low shear rates and accordingly do not present leakage problems in writing instruments such as roller ball writing instruments. However, when subjected to shear rates such as are produced in writing, the inks undergo shear-thinning and are readily flowable to provide writing of excellent quality and performance characteristics. Accordingly, the invention presents to the art shear-thinning inks which present an idealized combination of desirable performance characteristics and which are unexpectedly different from inks known to the art at the time this invention was made.

We claim:
1. A shear-thinning ink composition which does not undergo a significant change in viscosity in response to temperature and which consists essentially of:
   (a) from about 50 to about 99 percent by weight of the total composition weight of a polar solvent system including at least about 50 percent by weight water,
   (b) colorant material, and
   (c) from about 0.7 to about 6 percent by weight of the total composition weight of a water-dispersible, polymeric shear-thinning material said ink composition having a shear-thinning index of from 0.01 to 0.6, a viscosity of 50 cPs or greater at a shear rate of 30 sec$^{-1}$ and a viscosity of 100 cPs or less at shear rates produced by writing.

2. A composition of claim 1 where the viscosity at a shear rate of 30 sec$^{-1}$ is 100 cPs or greater.

3. A composition of claim 1 where said polymeric shear-thinning material is xanthan gum or carageenan gum or locust bean gum or hydroxyethylcellulose or guar gum or mixtures of these.

4. A composition of claim 1 having a shear-thinning index of from about 0.1 to about 0.2.

5. A composition of claim 1 where said polar solvent system comprises a minor proportion of a polar solvent(s) other than water.

6. A composition of claim 5 where said polar solvent other than water is selected from the class consisting of glycerol, ethylene glycol, propylene glycol or mixtures of these.

7. A composition of claim 1 including a drying and levelling agent.

8. A composition of claim 1 where said drying and levelling agent is a fluorinated polysilane surface-active agent.

9. A composition of claim 1 where said polar solvent system comprises greater than 70 percent by weight water.

10. A composition of claim 1 where said polar solvent system comprises greater than 85 percent by weight water.

11. A composition of claim 1 where said polar solvent system comprises greater than 95 percent by weight water.

12. A composition of claim 1 where said polymeric shear-thinning material is present in an amount between about 0.7 about 5 percent by weight of the composition.

13. A composition of claim 1 where said polymeric shear-thinning material is present in an amount between about 0.7 to about 2.5 percent by weight of the composition.

14. A shear-thinning ink composition consisting essentially of:
   (a) from about 50 to about 99 percent by weight of the total composition weight of a polar solvent system including at least about 50 percent by weight water,
   (b) from about 0.1 to about 30 percent by weight of the total composition weight of colorant material, and
   (c) from about 0.7 to about 6 percent by weight of the total composition weight of a water-dispersible, polymeric shear-thinning material selected from the group consisting of xanthan gum, carrageenan gum, locust bean gum, hydroxyethylcellulose, guar gum or mixtures of these, said ink composition having a shear-thinning index of from 0.01 to 0.6, a viscosity of 50 cPs or greater at a shear rate of 30 sec$^{-1}$ and a viscosity of 100 cPs or less at shear rates produced by writing.

15. A composition of claim 14 where the viscosity at a shear rate of 30 sec$^{-1}$ is 100 cPs or greater.

16. A composition of claim 14 having a shear-thinning index of from about 0.1 to about 0.2.

17. An ink composition of claim 14 where said polar solvent system comprises a minor proportion of a polar solvent(s) other than water.

18. A composition of claim 17 where said polar solvent other than water is selected from the class consisting of glycerol, ethylene glycol, propylene glycol or mixtures of these.

19. A composition of claim 14 including a drying and levelling agent.

20. A composition of claim 19 where said drying and levelling agent is a fluorinated polysilane surface-active agent.

21. A composition of claim 14 where said polar solvent system comprises greater than 70 percent by weight water.

22. A composition of claim 14 where said polar solvent system comprises greater than 85 percent by weight water.

23. A composition of claim 14 where said polar solvent system comprises greater than 95 percent by weight water.

24. A composition of claim 14 where said polymeric shear-thinning material is present in an amount between about 0.7 to about 5 percent by weight of the composition.

25. A composition of claim 14 where said polymeric shear-thinning material is present in an amount between about 0.7 to about 2.5 percent by weight of the composition.

26. A shear-thinning ink composition consisting essentially of:
   (a) from about 50 to about 99 percent by weight of the total composition weight of a polar solvent system including at least about 50 percent by weight water,
   (b) from about 0.1 to about 30 percent by weight of the total composition weight of colorant material, and
   (c) from about 0.7 to about 6 percent by weight of the total composition weight of xanthan gum, said ink composition having a shear-thinning index of from 0.01 to 0.6, a viscosity of 50 cPs or greater at a shear rate of 30 sec$^{-1}$ and a viscosity of 100 cPs or less at shear rates produced by writing.

27. A composition of claim 26 where the viscosity at a shear rate of 30 sec$^{-1}$ is 100 cPs or greater.

28. A composition of claim 26 having a shear-thinning index of from about 0.10 to about 0.20.

29. A composition of claim 26 where said polar solvent system comprises a minor proportion of a polar solvent(s) other than water.

30. A composition of claim 29 where said polar solvent other than water is selected from the class consisting of glycerol, ethylene glycol, propylene glycol or mixtures of these.

31. A composition of claim 26 including a drying and levelling agent.

32. A composition of claim 31 where said drying and levelling agent is a fluorinated polysilane surface-active agent.

33. A composition of claim 26 where said polar solvent system comprises greater than 70 percent by weight water.

34. A composition of claim 26 where said polar solvent system comprises greater than 85 percent by weight water.

35. A composition of claim 26 where said polar solvent system comprises greater than 95 percent by weight water.

36. A composition of claim 26 where said polymeric shear-thinning material is present in an amount between about 0.7 to about 5 percent by weight of the composition.

37. A composition of claim 26 where said polymeric shear-thinning material is present in an amount between about 0.7 to about 2.5 percent by weight of the composition.

* * * * *